United States Patent [19]

Fujioka et al.

[11] Patent Number: 4,875,280
[45] Date of Patent: Oct. 24, 1989

[54] VEHICLE ASSEMBLY LINE

[75] Inventors: Toyohiko Fujioka; Hideki Takeshima, both of Hiroshima, Japan

[73] Assignee: Mazda Motor Corporation, Hiroshima, Japan

[21] Appl. No.: 273,722

[22] Filed: Nov. 17, 1988

Related U.S. Application Data

[63] Continuation-in-part of Ser. No. 3,816, Jan. 16, 1987, abandoned.

[30] Foreign Application Priority Data

Jan. 17, 1986 [JP] Japan ................................ 61-7602

[51] Int. Cl.⁴ ............................................. B23P 21/00
[52] U.S. Cl. ........................................ 29/783; 29/430; 198/411
[58] Field of Search ............... 198/411, 414, 680, 379; 104/35–37, 44, 45; 29/430, 711, 712, 791, 783

[56] References Cited

U.S. PATENT DOCUMENTS

| | | | |
|---|---|---|---|
| 2,598,163 | 5/1952 | Halls | 198/379 X |
| 2,657,666 | 11/1953 | Fowler | 198/379 X |
| 3,468,435 | 9/1969 | Ellwanger et al. | 198/379 X |
| 4,341,161 | 7/1982 | Morita et al. | 198/680 X |
| 4,408,539 | 10/1983 | Wakabayashi | 198/680 X |
| 4,457,419 | 7/1984 | Ogami et al. | 198/414 X |
| 4,462,315 | 7/1984 | Wakabayashi | 104/89 X |
| 4,475,462 | 10/1984 | Tsumaki et al. | 104/89 X |
| 4,561,358 | 12/1985 | Burgess | 104/89 |
| 4,609,093 | 9/1986 | Taketani et al. | 198/680 X |

FOREIGN PATENT DOCUMENTS

| | | | |
|---|---|---|---|
| 55-24019 | 6/1980 | Japan . | |
| 1123962 | 11/1984 | U.S.S.R. | 198/414 |

Primary Examiner—Frank E. Werner
Assistant Examiner—D. Glenn Dayoan
Attorney, Agent, or Firm—Gerald J. Ferguson, Jr.

[57] ABSTRACT

A vehicle assembly line in which a vehicle body is conveyed by a hanger from station to station is provided between a first working area and a second working area with a vehicle body reversing system for reversing the orientation of the vehicle body with respect to the hanger, in which the vehicle body is conveyed by the hanger, from a first direction to a second direction. The first working area consists of stations in which are performed operations which can be done without interference from the hanger so long as the vehicle body is oriented in the first direction and the second working area consists of stations in which are performed operations which can be done without interference from the hanger so long as the vehicle body is oriented in the second direction.

6 Claims, 6 Drawing Sheets

VEHICLE ASSEMBLY LINE

BACKGROUND OF THE INVENTION

This application is a continuation-in-part of Ser. No. 003,816, filed 1/16/87, now abandoned.

1. Field of the Invention

This invention relates to a vehicle assembly line for welding and assembling a vehicle body while the vehicle body is conveyed or for equipping a vehicle while the vehicle body is conveyed, and more particularly to such a vehicle assembly line in which the vehicle body is conveyed while supported on a substantially L-shaped hanger.

2. Description of the Prior Art

Conventionally, in a vehicle assembly line for welding and assembling a vehicle body or for equipping a vehicle body with various parts, the vehicle body is generally conveyed from station to station while supported by a substantially L-shaped hanger. (See Japanese Utility Model Publication No. 55(1980)-24019, for example.)

There has been a problem in such vehicle assembly lines that a part of the L-shaped hanger is inherently positioned on the front side or the rear side of the vehicle body, interfering with the parts to be mounted on the vehicle body, the working devices and/or the operators, thereby lowering the working efficiency and hindering automation of the line. That is, for example, in the case that welding is to be effected on the front side of the vehicle body by a welding robot or a windshield is to be mounted with the vehicle body supported from the front side, the support post of the hanger will interfere with the arm of the welding robot or the windshield and, accordingly, the operation or the control must be complicated in order to avoid the said interference.

SUMMARY OF THE INVENTION

In view of the foregoing observations and description, the primary object of the present invention is to provide a vehicle assembly line using an L-shaped hanger in which the work in each working station can be effected without interference with a part of the L-shaped hanger, thereby improving the working efficiency in each working station.

In accordance with the present invention, there is provided a vehicle assembly line in which a vehicle body is conveyed by a hanger from station to station characterized in that there is provided between a first working area and a second working area a vehicle body reversing means for reversing the orientation of the vehicle body with respect to the hanger, in which the vehicle body is conveyed by the hanger, from a first direction to a second direction. The first working area consists of stations in which are performed operations which can be done without interference from the hanger so long as the vehicle body is oriented in the first direction and the second working area consists of stations in which are performed operations which can be done without interference from the hanger so long as the vehicle body is oriented in the second direction.

DESCRIPTION OF THE PREFERRED EMBODIMENTS

Figure 1:
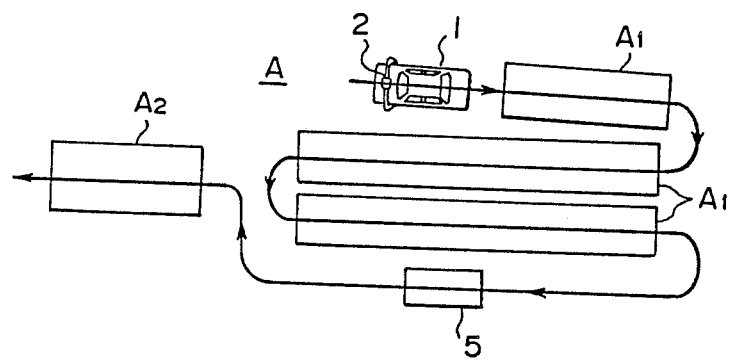
FIG. 1 is a schematic view showing a vehicle assembly line in accordance with an embodiment of the present invention.
Figure 2:
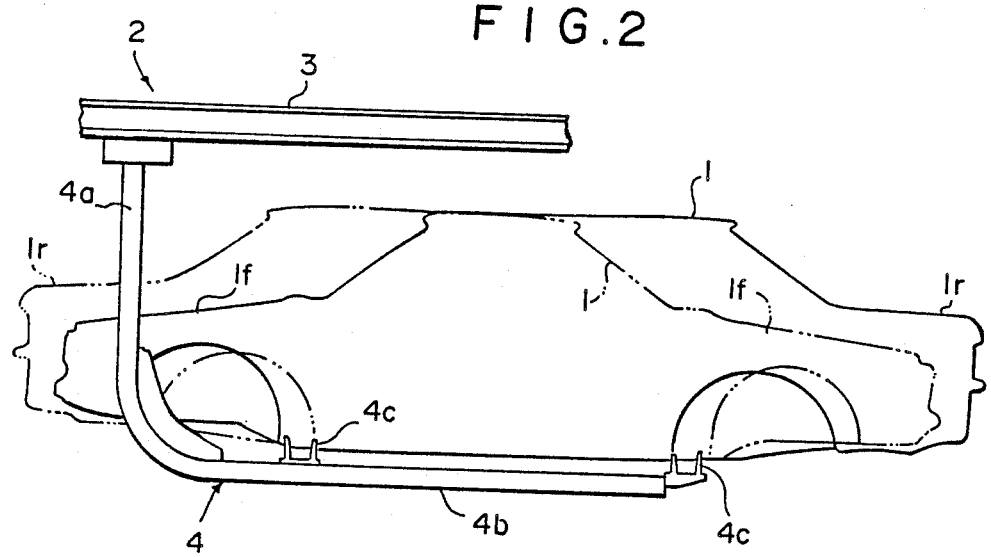
FIG. 2 is a schematic view showing the conveyor system employed in the vehicle assembly line.

In FIGS. 1 and 2, a conveyor system 2 for conveying a vehicle body 1 comprises an overhead rail 3 provided above an assembly line A and an L-shaped hanger 4 arranged to move along the overhead rail 3. The hanger 4 comprises a pair of suspended portions 4a extending vertically down from the rail 3 and a pair of horizontal portions 4b which extend horizontally from the lower ends of the suspended portions 4a and are provided with jigs 4c for supporting the vehicle body 1 from below. The hanger 4 can support the vehicle body 1 either from the front with the suspended portions 4a positioned on the front side 1f of the vehicle body 1 or from the rear with the suspended portions 4a positioned on the rear side 1r of the vehicle body 1.

The assembly line A comprises a first group of stations $A_1$ in which are performed operations which can be done without being interfered with by the suspended portions 4a of the hanger 4 so long as the suspended portions 4a are on the front side 1f of the vehicle body 1, e.g., those which can be performed from the rear side 1r of the vehicle body 1, and the second group of stations $A_2$ in which are performed operations which can be done without being interfered with by the suspended portions 4a of the hanger 4 so long as the suspended portions 4a are on the rear side 1r of the vehicle body 1, e.g., those which can be performed from the front side 1f of the vehicle body 1. For example, the first group of stations $A_1$ includes a station for effecting reinforcement welding of the side panel to the underbody which have been tacked together, and a station for mounting a roof reinforcement or the like. The second group of stations $A_2$ includes, for example, a station for mounting on the vehicle body 1 parts to be mounted on the front side of the vehicle, e.g., a front fender and a hood, and a station for mounting parts in the engine compartment.

The vehicle body 1 is fed in the first group of stations $A_1$ with the front side 1f thereof being directed toward the suspended portions 4a of the hanger 4, i.e., supported by the hanger from the front. After passing through the first group of stations $A_1$, the vehicle body 1 is reversed by a reversing system 5 disposed between the first group of stations $A_1$ and the second group of stations $A_2$ so that the rear side 1r thereof is directed toward the suspended portions 4a of the hanger 4.

Figure 3:
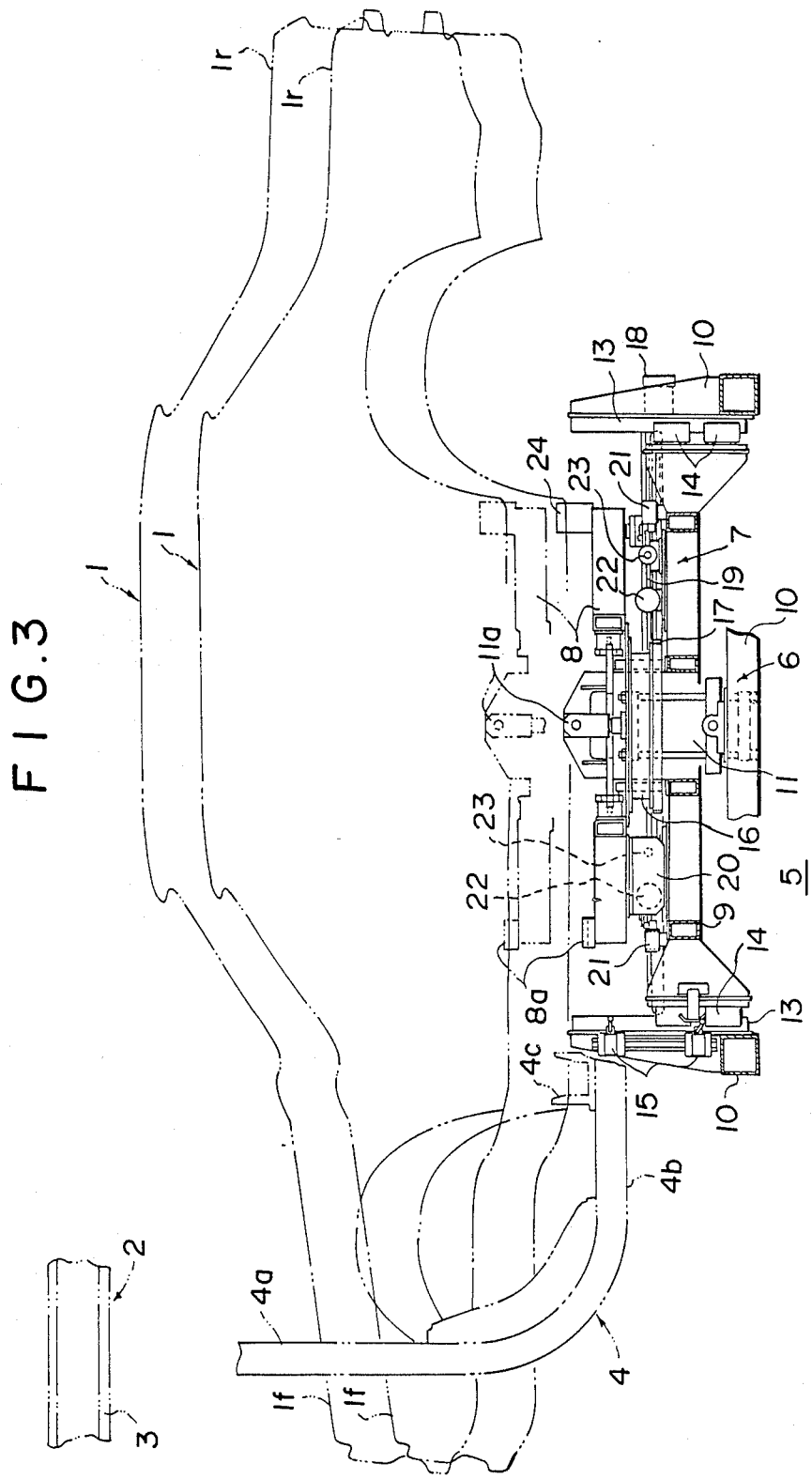
FIG. 3 is a front view partly in cross section of the reversing system employed in the vehicle assembly line.
Figure 4:
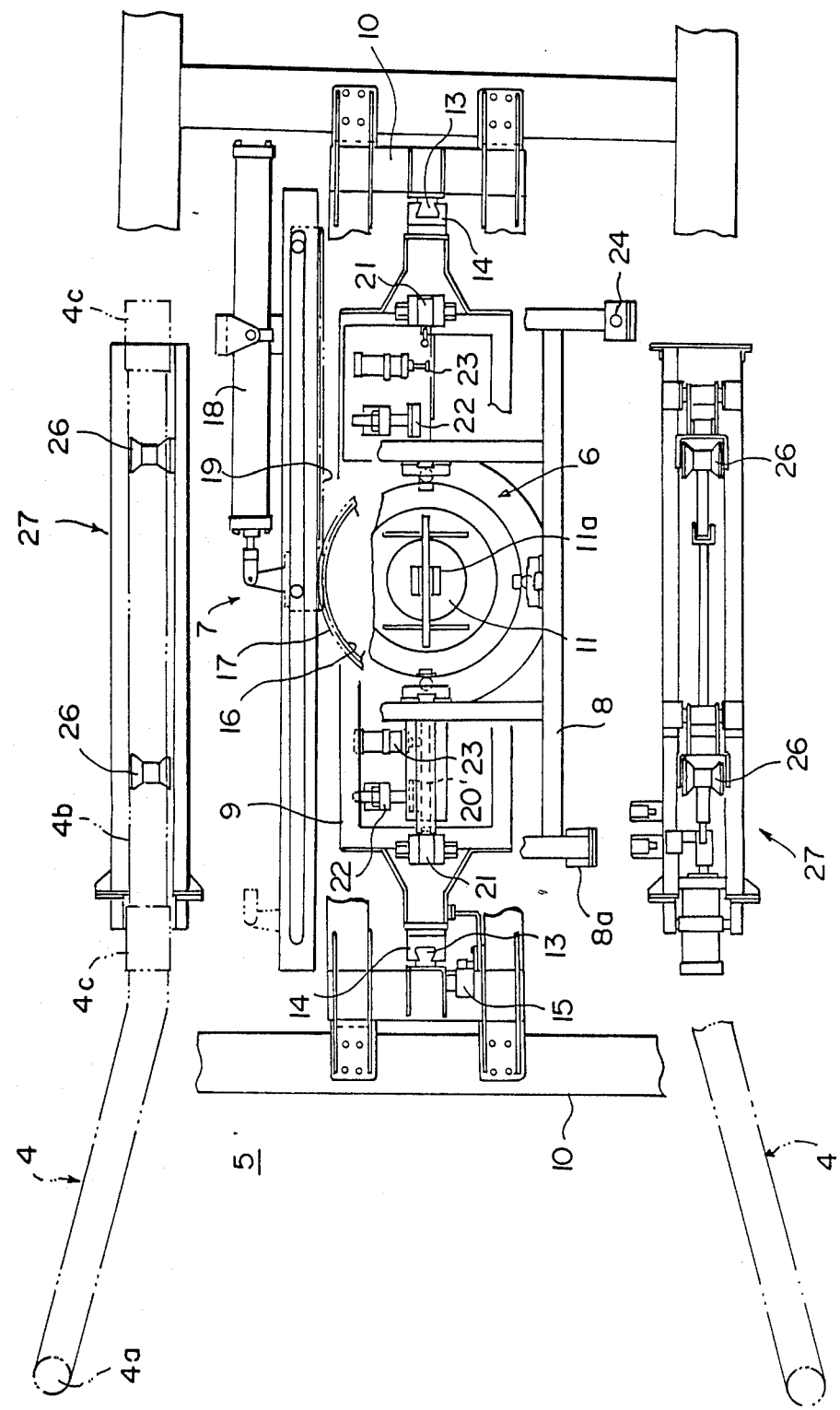
FIG. 4 is a plan view of the reversing system.
Figure 5:
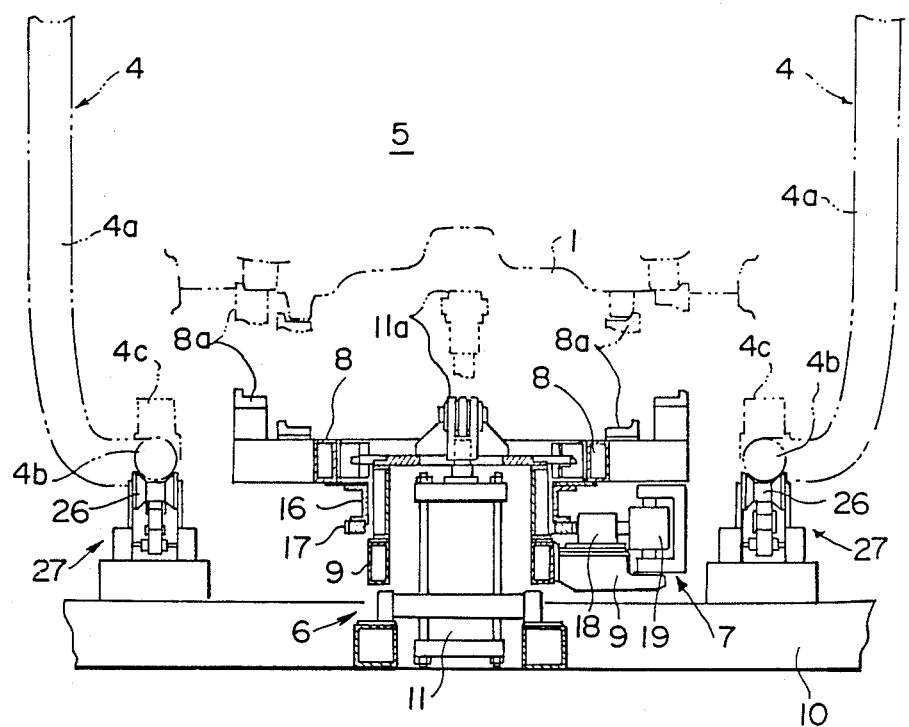
FIG. 5 is a side view of the reversing system.

As shown in FIGS. 3 to 5, the reversing system 5 comprises a lift mechanism 6 for lifting the vehicle body 1 supported by the hanger 4, and a turning mechanism 7.

That is, the reversing system 5 includes a support frame 8 having jigs 8a adapted to abut against the bottom of the vehicle body 1. The support frame 8 is supported for rotation on a base frame 9, and the base frame 9 is supported on the free end of a rod 11a of an up-anddown cylinder mechanism 11 fixedly mounted on a stationary base 10 to be moved up and down together with the support frame 8 by the cylinder mechanism 11. An engagement member 14 to be engaged with a vertical guide rail 13 is provided on each end of the base frame 9. The base frame 9 is moved up and down by the cylinder mechanism 11 under the guidance of the guide rail 13 between an uppermost position and a lowermost position defined by limit switches 15.

The support frame 8 is provided with a central tubular portion 16 and a gear 17 is formed on the outer periphery of the central tubular portion 16. The base frame 9 is provided with a rack 19 to be slid by a cylinder 18. The rack 9 is in mesh with the gear 17 so that the support frame 8 is rotated by about 180° in response to expansion and contraction of the cylinder 18.

The support frame 8 is provided with an abutment member 20 which is adapted to abut against a pair of limit switches 21 spaced from each other by 180° to control the cylinder 18. The abutment member 20 is further adapted to abut against cushioning members 22 and 23 to buffer shock when the support frame 8 stops. The support frame 8 is further provided with a contactless switch 24 for detecting the vehicle body 1.

On each of the opposite sides of the reversing system 5 is provided a vibration preventing device 27 which comprises a guide roller 26 for supporting the lower portion of the hanger 4 to prevent vibration of the hanger 4.

Figure 6:
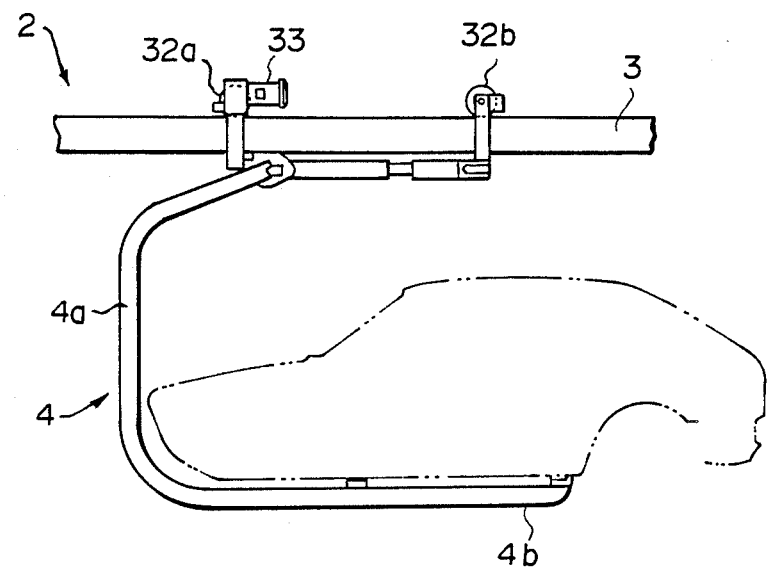
FIG. 6 is a side view showing in more detail the conveyor system of FIG. 2.
Figure 7:
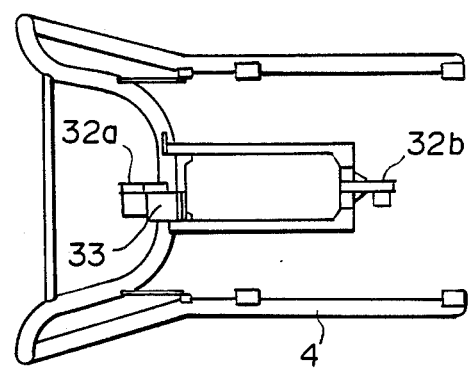
FIG. 7 is a plan view showing in more detail the conveyor system of FIG. 2.
Figure 8:
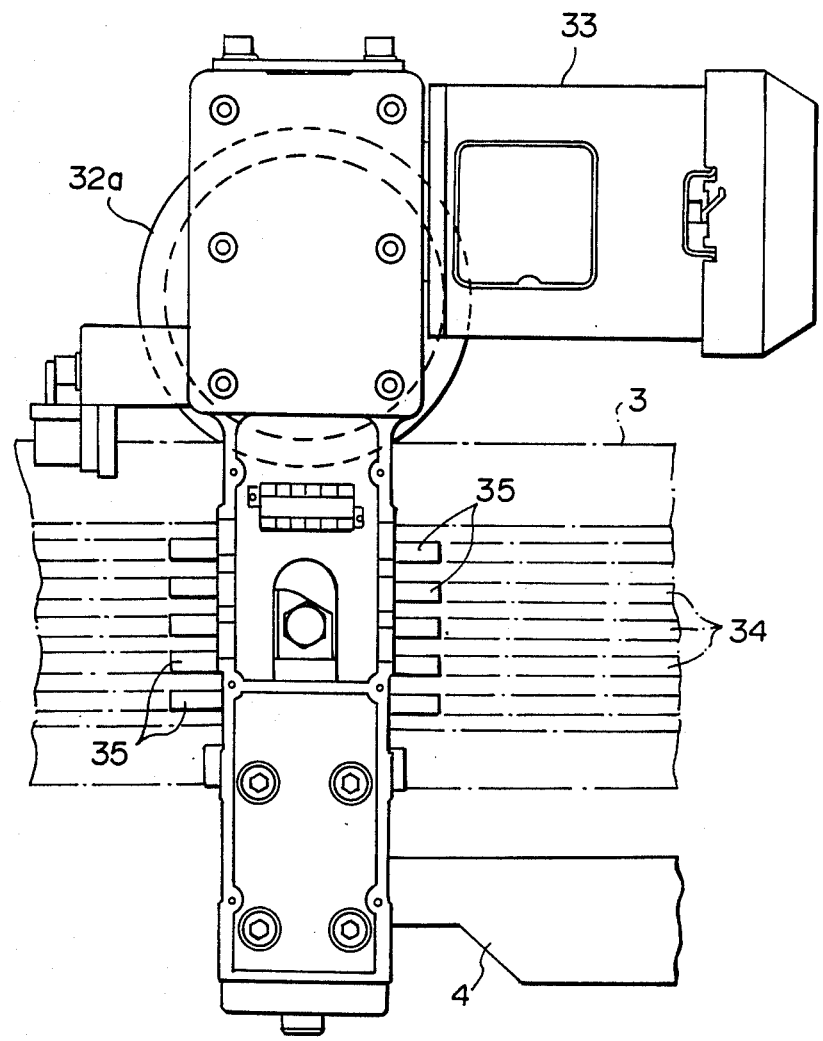
FIG. 8 is an enlarged fragmentary side view showing in detail a part of the conveyor system of FIG. 2.

FIGS. 6 to 8 show in detail the conveyor system 2. The hanger 4 of the conveyor system 2 in this particular embodiment is of an automatic traveling type. That is, a plurality of feeders 34 which are like grooves in shape is formed on one side of the rail 3, and the hanger 4 is provided with a plurality of current collectors 35 which can slide along the rail 3 while maintaining an electrical contact with the feeders 34. The hanger 4 is supported on the rail 3 by way of wheels 32a and 32b which are driven by a driving motor 33. The driving motor 33 drives the wheels 32a and 32b forward or rearward or stops the same according to a signal obtained by way of the current collectors 35.

When the vehicle body 1 is fed to the reversing station 5 by the conveyor system 2 with the suspended portions 4a positioned on the front side 1f of the vehicle body 1 and is stopped in a predetermined position, vibration of the hangers 4 is first restrained by the vibration preventing devices 27 and the cylinders 11 is operated to lift the base frame 9 together with the support frame 8 after the vehicle body 1 is stabilized. Thus the vehicle body 1 is lifted from the horizontal portions 4b of the hanger 4 by the support frame 8 and, thereafter, the hanger 4 is moved rearward to not interfere with the vehicle body 1 or the reversing system 5. Then the cylinder 18 is operated to rotate the support frame 8 by 180°, thereby rotating the vehicle body 1 on the support frame 8 by 180°. The hanger 4 is subsequently moved forward to insert the horizontal portions 4b below the vehicle body 1 and the support frame 8 is lowered to deliver the vehicle body 1 to the hanger 4. After the vehicle body 1 is thus reversed with respect to the hanger 4, the hanger 4 feeds the vehicle body 1 to the second group of stations $A_2$. That is, when the hanger 4 reaches the reversing station 5, supply of current to the driving motor 33 is interrupted to stop the hanger 4 in a predetermined position, and a rearward signal is fed to the driving motor 33 for a predetermined time interval a predetermined time after the hanger 4 is stopped in the predetermined position, thereby moving rearward the hanger 4 from the vehicle body 1, the latter predetermined time corresponding to the time for restraining vibration of the hanger 4 by the vibration preventing devices 27 and the former predetermined time interval being for permitting the hanger 4 moving rearward not to interfere with the vehicle body 1 or the reversing system 5. Further, when another predetermined time lapses, a forward signal is supplied to the driving motor 33 to forward the hanger 4 to receive the vehicle body 1, said another predetermined time being for permitting rotation of the vehicle body 1. Thereafter, a forward signal for feeding the hanger 4 to the second group of stations $A_2$ is supplied to the driving motor 33. The control of the hanger 4 described above is effected by signals supplied to the driving motor 33 by way of feeders 34. The feeders 34 are not continuous over the length of the rail 3, but are separated between adjacent stations so that the hanger 4 can be controlled in each station independently from the other stations.

Such an automatic traveling type hanger is advantageous over a chain driving type overhead conveyor in that since each hanger can be controlled independently from the other hangers, the spaces between adjacent stations can be freely determined and the hanger can be freely controlled in each station.

Though the present invention has been described above as applied to assembly of the vehicle body, the present invention can be applied to a vehicle assembly line for equipping a vehicle while the vehicle body is conveyed. In such a case, the first group of stations $A_1$ may include, for instance, a station for equipping the vehicle body with underbody parts such as a fuel tank, a silencer and a brake line, and a station for equipping the vehicle body with trimmings such as a bumper, rear combination lamps, tires and a spare tire, while the second group of stations $A_2$ may include a station for equipping the vehicle with windows, e.g., coating of body primer, mounting of windows and the like, a station for mounting seats, a station for effecting work in the engine compartment such as mounting of a battery, and supply of fluids, e.g., windshield washer liquid, engine oil and the like.

In this specification, the term "a vehicle assembly line" should be broadly interpreted to include lines for welding and assembling a vehicle body while the vehicle body is conveyed and for equipping a vehicle while the vehicle body is conveyed.

We claim:

1. A vehicle assembly line including a conveying means which a vehicle body is conveyed from station to station comprising:
   a hangar operatively connected to said conveying means, said hanger comprising a suspended portion disposed at an upper portion thereof by which said hanger is suspended from said conveying means, an arm portion extending downward from said suspended portion, and a support portion disposed at an end of said arm portion for horizontally supporting a vehicle body from the lower side thereof, said arm portion passes alongside a portion of a transverse side of the vehicle body when carried by said hanger thereby interfering with access to the portion of the vehicle body for working thereon;
   a first working area in which a vehicle body is conveyed while oriented in a first for-aft direction including at least one station whereat operations are performed on an area of the vehicle body that is not interfered with by said arm portion of said hanger;

a vehicle body reversing means located after said first working area, for reversing the fore-aft orientation of the vehicle body with respect to said hanger to a second fore-aft direction, said reversing means adapted to reverse the vehicle body about a vertical axis thereof, whereby the portion of the vehicle body that was interfered with while oriented in the first fore-aft direction by said arm portion of said hanger is moved to a non-interfering position and a portion of the area of the vehicle body not interfered with in said first fore-aft position is moved to a position interfered with by said arm portion while oriented in the second fore-aft direction; and a secondary working area in which the vehicle body is conveyed while oriented in the second fore-aft direction including at least one station in which operations are performed on the area of the vehicle body that is not interfered with by said arm portion of said hanger and that was previously interfered with by said arm portion in the first fore-aft direction of the vehicle body.

2. A vehicle assembly line as defined in claim 1 in which said arm portion vertically extends on the front side or the rear side of the vehicle body.

3. A vehicle assembly line as defined in claim 1 in which said reversing means comprises a lift means which is adapted to lift the vehicle body away from the support portions and to lower the vehicle body onto the same and a body rotating means which is adapted to rotate the vehicle body by 180°.

4. A vehicle assembly line as defined in claim 1 in which the stations forming the first working area include a station for effecting reinforcement welding of the side panel to the underbody which have been tacked together, and a station for mounting a roof reinforcement and the stations forming the second working area include stations for mounting on the vehicle body a front fender and a hood.

5. A vehicle assembly line as defined in claim 1 in which said vehicle body reversing means is mounted on a reversing-and-transferring station and comprises an up-and-down means for removing the vehicle body carried in the reversing-and-transferring station from the hanger and for returning the vehicle body to the hanger after the vehicle body is reversed in fore-aft orientation, and a 180°-turning means which turns the vehicle body around the vertical axis thereof by 180° so that the portion of the vehicle body interfered with in the first fore-aft orientation is moved to a position not interfered with thus permitting operations to be performed thereon in subsequent stations of said second work area which would have been hindered in said first work area by said arm portion of said hanger, and a portion of the vehicle body that was operated on in said first work area is moved to a position interfered with by said arm portion.

6. A vehicle assembly line as defined in claim 5 in which said hanger is substantially of an L-like shape.

* * * * *